United States Patent
Chen et al.

(10) Patent No.: US 8,253,407 B2
(45) Date of Patent: Aug. 28, 2012

(54) VOLTAGE MODE SWITCHING REGULATOR AND CONTROL CIRCUIT AND METHOD THEREFOR

(75) Inventors: An-Tung Chen, Pingzhen (TW); Jo-Yu Wang, Hsinchu (TW)

(73) Assignee: Richtek Technology Corporation, Hsin-Chu (TW)

( * ) Notice: Subject to any disclaimer, the term of this patent is extended or adjusted under 35 U.S.C. 154(b) by 449 days.

(21) Appl. No.: 12/658,549

(22) Filed: Feb. 5, 2010

(65) Prior Publication Data
US 2010/0201336 A1 Aug. 12, 2010

(30) Foreign Application Priority Data
Jun. 2, 2009 (TW) ................................ 98118191 A (51) Int. Cl.
*G05F 1/40* (2006.01)
(52) U.S. Cl. .......................... 323/288; 323/284; 323/351
(58) Field of Classification Search .......... 323/282–285, 323/288, 351
See application file for complete search history.

(56) References Cited

U.S. PATENT DOCUMENTS

| | | | |
|---|---|---|---|
| 5,747,977 A * | 5/1998 | Hwang | 323/284 |
| 5,903,138 A * | 5/1999 | Hwang et al. | 323/266 |
| 6,396,252 B1 | 5/2002 | Culpepper et al. | |
| 6,469,914 B1 * | 10/2002 | Hwang et al. | 363/21.01 |
| 7,456,624 B2 | 11/2008 | Sheng et al. | |
| 7,928,715 B2 * | 4/2011 | Shibata | 323/288 |
| 8,085,022 B2 * | 12/2011 | Chen et al. | 323/282 |

* cited by examiner

*Primary Examiner* — Jessica Han
(74) *Attorney, Agent, or Firm* — Tung & Associates (57) ABSTRACT

The present invention discloses a voltage mode switching regulator with improved light load efficiency and mode transition characteristic, and a control circuit and a control method therefor. The switching regulator can switch between a pulse width modulation (PWM) mode and a pulse skipping mode. The control method for the switching regulator comprises: comparing a feedback signal relating to an output voltage with a reference signal, to generate an error amplification signal; generating a duty signal according to the error amplification signal and a ramp signal, to control the switching regulator; setting a threshold level of the error amplification signal and a threshold level of the pulse skipping mode according to the error amplification signal in a stable status; and when the error amplification signal is close or equal to the threshold level of the pulse skipping mode, generating a pulse skip signal to enter the pulse skipping mode.

36 Claims, 8 Drawing Sheets

VOLTAGE MODE SWITCHING REGULATOR AND CONTROL CIRCUIT AND METHOD THEREFOR

BACKGROUND OF THE INVENTION

1. Field of Invention

The present invention relates to a switching regulator with improved light load efficiency and mode transition characteristic, and a control circuit and a control method therefor; particularly, it relates to a switching regulator capable of performing proper mode switching control without requiring an input voltage signal or an output voltage signal, and a control circuit and a control method therefor.

2. Description of Related Art

Figure 1:
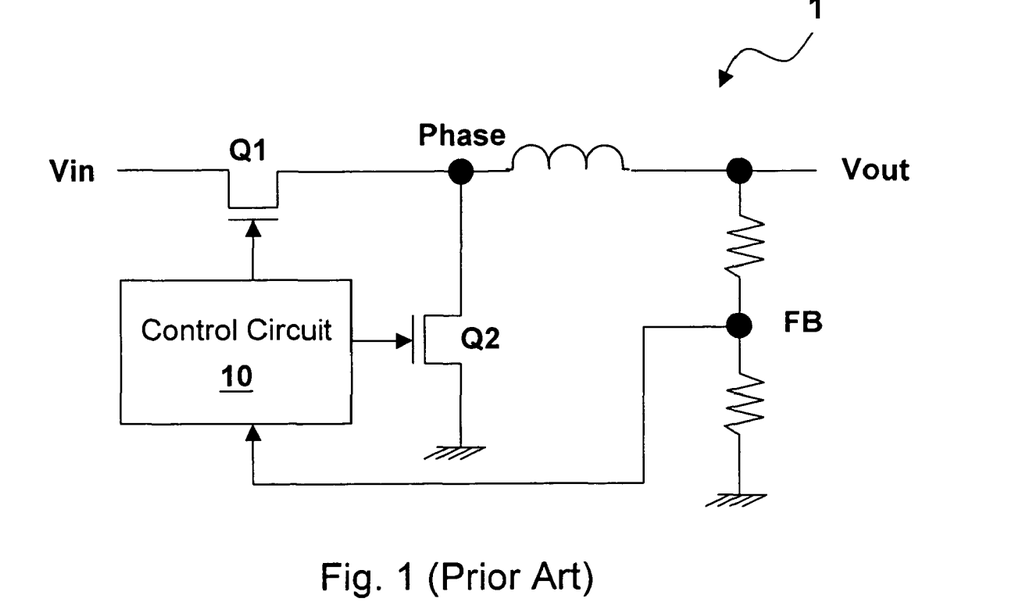
FIGS. 1-4 show prior art buck converter, boost converter, inverter converter, and buck-boost converter, respectively.
Figure 2:
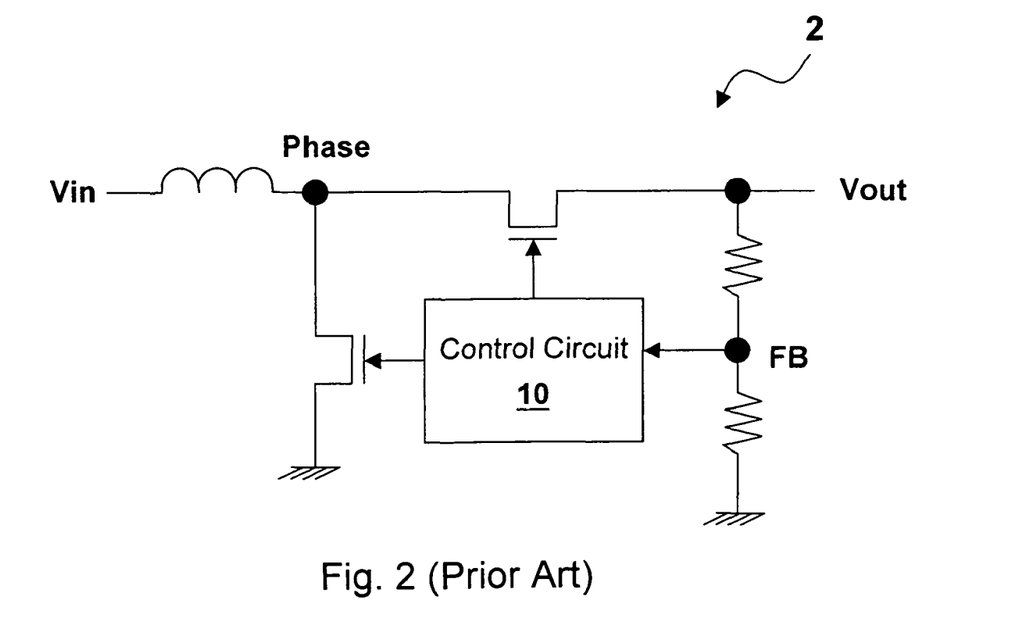
Figure 3:
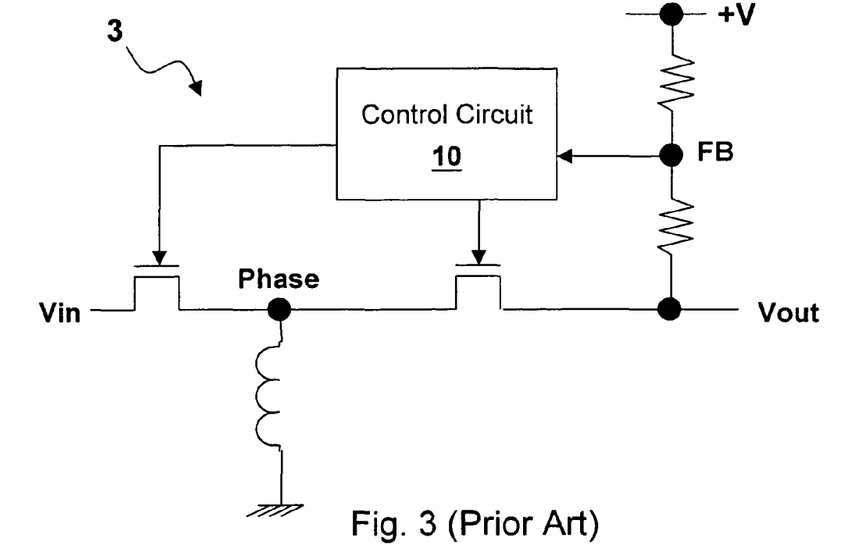
Figure 4:
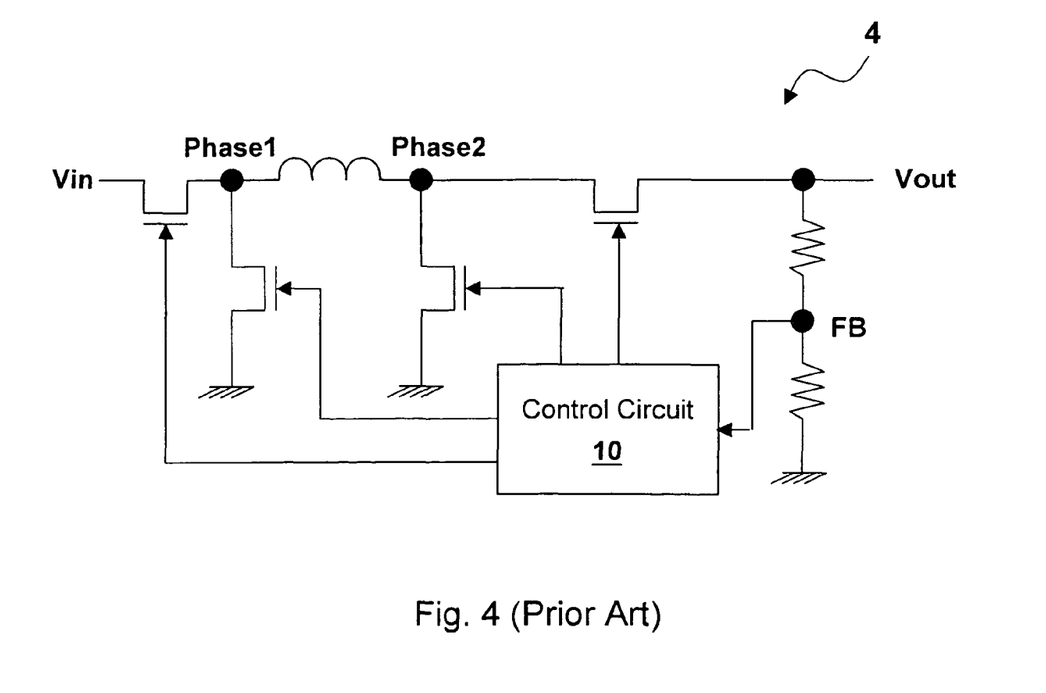

There are many types of switching regulators, such as buck converter, boost converter, inverter converter, and buck-boost converter, etc. The aforementioned regulators can also be divided into synchronous and asynchronous types. There are two (four for buck-boost converter) power transistor switches in the synchronous switching regulators, and one of the power transistor switches is replaced by a diode in the non-synchronous regulators. By way of example, FIG. 1 shows a synchronous buck converter 1 which includes two power transistor switches Q1 and Q2, controlled by a control circuit 10. The control circuit 10 generates control signals according to a feedback signal FB obtained from the output Vout, and the transistor switches Q1 and Q2 are controlled by the control signals to convert electrical power from an input Vin to an output Vout. FIGS. 2-4 show a boost converter 2, an inverter converter 3, and a buck-boost converter 4, respectively. Though the circuit architecture and the number of transistors are different, these circuits operate under the same mechanism: The control circuit 10 generates control signals according to the feedback signal FB, and the power transistor switches operate to convert the electrical power from the input Vin to the output Vout according to the control signals.

Figure 5:
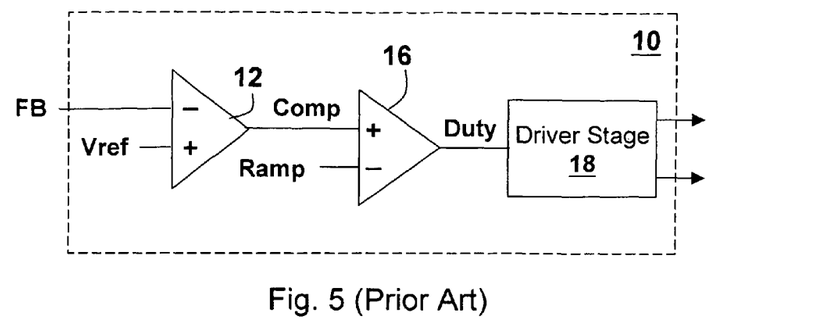
FIG. 5 is a schematic circuit diagram showing an internal structure of the control circuit 10 in a switching regulator.
Figure 6:
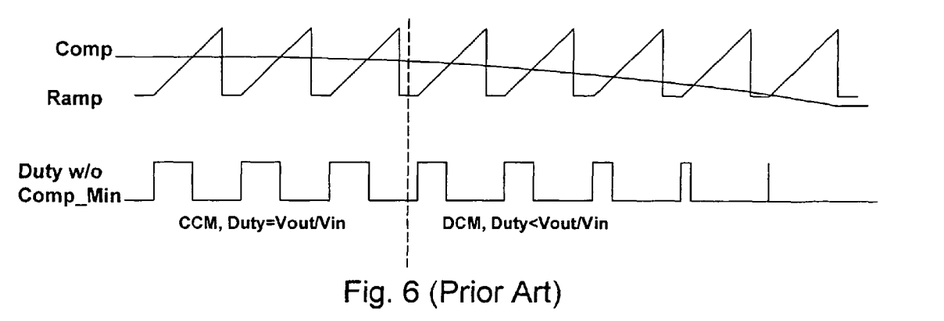
FIG. 6 explains the light load efficiency problem when the power transistor switches still operate in the PWM mode in light load condition.

In the aforementioned switching regulators, there is a light load efficiency issue if the power transistor switches still operate in the pulse width modulation (PWM) mode in light load condition ("light load" means that the load current, i.e., current supplied to a load circuit, is relatively low). Taking a voltage mode synchronous buck converter as an example, referring to FIG. 5, the control circuit 10 includes an error amplifier 12, a PWM comparator 16, and a driver stage 18. The error amplifier 12 generates an error amplification signal Comp by comparing the feedback signal FB with a reference signal Vref. The PWM comparator 16 generates a duty signal by comparing the error amplification signal Comp with a ramp signal Ramp. The driver stage 18 drives power transistor switches according to the duty signal. Referring to FIGS. 5 and 6, when the load current decreases, if the control circuit 10 is still operating in continuous conduction mode (CCM), the low gate transistor current could be less than zero and under such circumstance power is transmitted from the output back to the input, causing efficiency loss in power conversion. Thus, in light load condition, the low gate transistor should operate in a manner similar to a diode in an asynchronous converter, i.e., the so-called diode emulated mode, such that the regulator enters discontinuous conduction mode (DCM). When the regulator enters DCM from CCM, the voltage COMP decreases as the load current decreases, and the pulse width of the signal Duty decreases as well. However, if the load current decreases to an extent that the pulse width of the signal Duty becomes lower than a specific width, the power converted from the input to the output will be extremely limited, but the switching loss to operate the up and low gate transistors each time remains unchanged. A power conversion inefficiency issue thus occurs. Moreover, when the load condition changes, requiring the regulator to return to CCM from DCM, because the signal COMP stays at a very low level in DCM, it needs more time to return to a higher level in CCM. The response time is slow, i.e., the mode transition characteristic is poor, causing a deeper undershoot of the output voltage.

Figure 7:
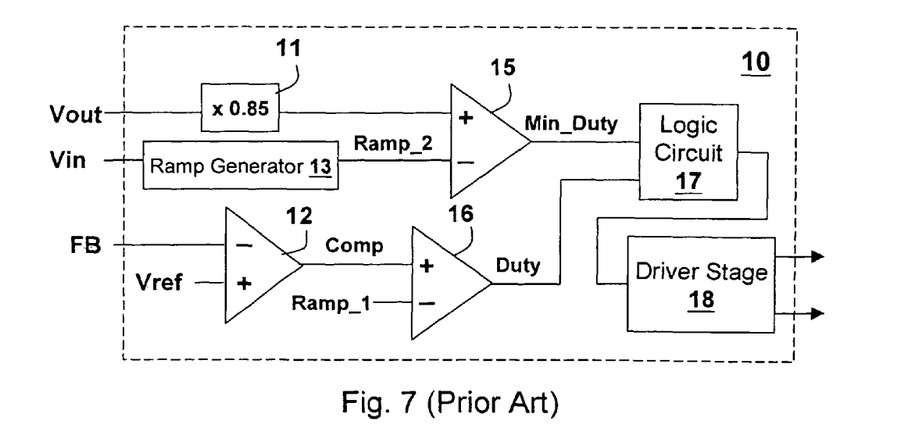
FIG. 7 shows the circuit proposed by U.S. Pat. No. 6,396,252 by a simplified schematic circuit diagram.

In view of the foregoing, U.S. Pat. No. 6,396,252 discloses a solution. The circuit shown in the original drawings of this patent is complicated, which is shown in FIG. 7 of this specification in a simplified form. This patent provides another circuit to generate a minimum pulse width Min_Duty. A logic circuit 17 selects the wider one between the minimum pulse width Min_Duty and the signal Duty, and outputs it to a driver stage 18. In this prior art, a scale circuit 11 obtains a specific ratio of the signal Vout, and a ramp generator 13 generates a signal Ramp_2 which is proportional to the input voltage Vin; the ratio of the signal Vout and the signal Ramp_2 is compared in a PWM comparator 15 to generate the minimum pulse width Min_Duty.

In the aforementioned prior art U.S. Pat. No. 6,396,252, the minimum pulse width Min_Duty is determined directly. This prior art has the following drawbacks: The input voltage Vin is essential to the circuit for generating the signal Ramp_2; the output voltage Vout is essential to the circuit for determining the minimum pulse width Min_Duty; an extra PWM comparator is essential; furthermore, the poor mode transition efficiency issue is not solved, i.e., the level of the signal COMP is too low in DCM that the response time is slow when the circuit switches from DCM to CCM.

U.S. Pat. No. 7,456,624 discloses a method and a circuit for entering the pulse skipping mode. Not many circuit details are disclosed in this patent, but it can be understood from its specification and figures that this prior art also needs the input voltage Vin and the output voltage Vout for mode control operation. The requirements for the input voltage Vin and the output voltage Vout are disadvantageous because more pins and more high voltage devices are required in an integrated circuit.

In view of the above drawbacks, it is desired to provide a switching regulator with improved mode transition efficiency, which does not require an input voltage signal or an output voltage signal for mode control, and a control circuit and a control method therefor.

SUMMARY OF THE INVENTION

A first objective of the present invention is to provide a switching regulator with improved light load efficiency and mode transition characteristic.

A second objective of the present invention is to provide a voltage mode switching regulator control circuit.

A third objective of the present invention is to provide a method for controlling a voltage mode switching regulator.

To achieve the purposes mentioned above, from one perspective, the present invention provides a voltage mode switching regulator switchable between a PWM mode and a pulse skipping mode, comprising: a power switch circuit including at least one power transistor switch, which converts an input voltage to an output voltage by operating the power transistor switch; an error amplifier generating an error amplification signal by comparing a feedback signal relating to the output voltage with a reference signal; a PWM comparator generating a duty signal according to the error amplification signal and a ramp signal, to thereby control the power transistor switch of the power switch circuit; an error amplification signal clamping circuit, which sets a threshold level of the error amplification signal and a threshold level of the pulse skipping mode, and clamps the error amplification signal so that the error amplification signal is not lower than the threshold level in a power transistor switch on-time control mode, or that the error amplification signal is not higher than the threshold level in a power transistor switch off-time control mode; and a pulse skipping circuit generating a pulse skipping signal when the error amplification signal is close or equal to the threshold level of the pulse skipping mode, such that the switching regulator enters the pulse skipping mode.

In one embodiment, the PWM mode includes a continuous conduction mode (CCM) and a discontinuous conduction mode (DCM), and the error amplification signal clamping circuit of the aforementioned switching regulator comprises a storage and transformation circuit, for setting the error amplification signal threshold level according to the error amplification signal in CCM, or for setting the error amplification signal threshold level according to a voltage of a non-constant potential node which is coupled to the power transistor switch.

In one embodiment, the storage and conversion circuit comprises an analog-to-digital converter to convert an error amplification signal to a digital signal in CCM, and a digital-to-analog converter to convert the digital signal to the threshold level of the error amplification signal.

In one embodiment, the storage and the conversion circuit comprises a low-pass filter to obtain an average voltage of the non-constant potential node, and a scale circuit to set a threshold level of the error amplification signal according to an output of the low-pass filter.

In one embodiment, the switching regulator further comprises a ramp signal setting circuit for setting the slope of the ramp signal so that the slope is related to the input voltage.

From another perspective, the present invention provides a voltage mode switching regulator control circuit comprising: an error amplifier generating an error amplification signal by comparing a feedback signal with a reference signal; a PWM comparator generating a duty signal according to an error amplification signal and a ramp signal; an error amplification signal clamping circuit, which sets a threshold level of the error amplification signal and a threshold level of a pulse skipping mode, and clamps the error amplification signal so that the error amplification signal is not lower than the threshold level in an on-time control mode, or that the error amplification signal is not higher than the threshold level in an off-time control mode; and a pulse skipping circuit, which generates a pulse skipping signal when the error amplification signal is close or equal to the threshold level of the pulse skipping mode.

In the aforementioned switching regulator and the control circuit, in one embodiment, the pulse skipping circuit generates a pulse skipping signal according to a current through the error amplification signal clamping circuit.

From another perspective, the present invention provides a method for controlling a voltage mode switching regulator, wherein the switching regulator is switchable between a PWM mode and a pulse skipping mode, the method comprising the steps of: comparing a feedback signal relating to an output voltage with a reference signal, to generate an error amplification signal; generating a duty signal according to the error amplification signal and a ramp signal, to control the switching regulator; setting a threshold level of the error amplification signal and a threshold level of the pulse skipping mode, and clamping the error amplification signal so that the error amplification signal is not lower than the threshold level in an on-time control mode, or that the error amplification signal is not higher than the threshold level in an off-time control mode; and when the error amplification signal is close or equal to the threshold level of the pulse skipping mode, generating a pulse skip signal such that the switching regulator enters the pulse skipping mode.

The present invention can be applied to a synchronous or an asynchronous buck converter, boost converter, inverter converter, and buck-boost converter etc.

The objectives, technical details, features, and effects of the present invention will be better understood with regard to the detailed description of the embodiments below.

DESCRIPTION OF THE PREFERRED EMBODIMENTS

Figure 8:
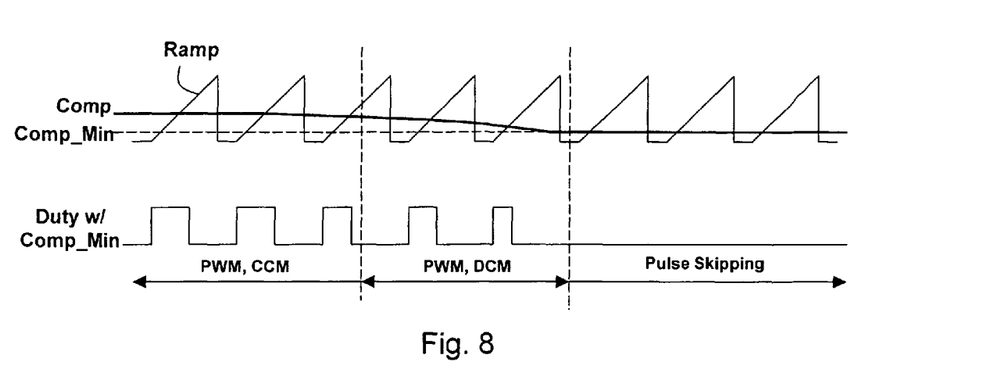
FIG. 8 shows that the present invention clamps a threshold level of the signal COMP.

Referring to FIG. 8, in the voltage mode control architecture, the present invention sets a threshold level for the signal COMP instead of setting the minimum pulse width; in this way, the mode transition characteristic can be improved. In general, two types of control schemes are typically used for controlling a switching regulator, i.e., the up gate on-time control scheme and the up gate off-time control scheme (or low gate on-time control scheme). In the up gate on-time control scheme, the present invention sets the minimum level of the signal COMP. And in the up gate off-time control scheme (or low gate on-time control scheme), the present invention sets the maximum level of the signal COMP. Referring to FIGS. 6 and 8, with the up gate on-time control scheme as an example, the minimum level of the signal COMP in the present invention is set to Comp_Min, which is the threshold level for the pulse skipping mode. This minimum level is generated by an error amplification signal clamping circuit (Comp clamping circuit, to be explained later). When the signal COMP drops to this minimum level, the switching regulator will enter the pulse skipping mode to reduce the switchings of the power transistor switches, until the load increases. The error amplification signal clamping circuit limits the signal COMP to be not less than Comp_Min. Thus, when the switching regulator returns to the PWM mode from the pulse skipping mode as the load changes, the signal COMP returns to the accurate level much faster, and the signal Duty quickly reaches the accurate pulse width, i.e., the mode transition efficiency is much better.

The setting of the minimum level Comp_Min is related to the input voltage Vin, the output voltage Vout, and the peak level and slope of the ramp signal Ramp; in other words, the minimum level Comp_Min varies in different application conditions. If the minimum level Comp_Min is set too high, the switching regulator enters the pulse skipping mode prematurely, and in this case the load circuit at the output terminal can not obtain a stable power from the input. If the minimum level Comp_Min is set too low, the light load efficiency and the mode transition efficiency from the pulse skipping mode to the PWM mode will be poor. According to the present invention, the ideal minimum level Comp_Min is slightly less than the level of the signal COMP in CCM. Therefore, the concept of the present invention is to determine the minimum level Comp_Min in accordance with the level of the signal COMP in CCM. In addition, even though the setting of the minimum level Comp_Min is related to the input voltage Vin and the output voltage Vout, advantageously, the present invention does not require obtaining a signal from the input terminal Vin or output terminal Vout.

Figure 9:
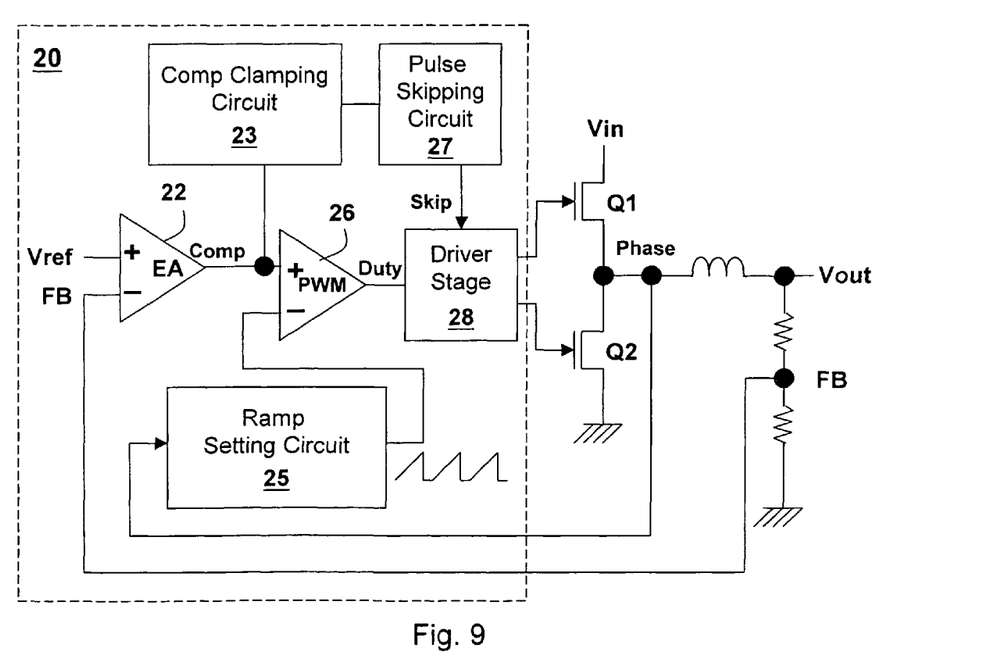
FIG. 9 shows an embodiment of the present invention.

Referring to FIG. 9, the first embodiment of the present invention is illustrated with a buck converter as an example. The switching regulator in this embodiment comprises a control circuit 20, which controls the operation of the power transistors Q1 and Q2 to convert electrical power from the input Vin to the output Vout. The control circuit 20 includes an error amplifier 22, a PWM comparator 26, a driver stage 28, an error amplification signal clamping circuit 23, a Ramp setting circuit 25 and a pulse skipping circuit 27. The error amplification signal clamping circuit (Comp clamping circuit) 23 determines the minimum level Comp_Min according to the level of the signal COMP in CCM or in a stable state. The Ramp setting circuit 25 is for generating a signal Ramp whose slope varies in accordance with the input voltage Vin. The Pulse skipping circuit 27 is for generating a pulse skipping signal Skip to trigger the pulse skipping mode.

Figure 10:
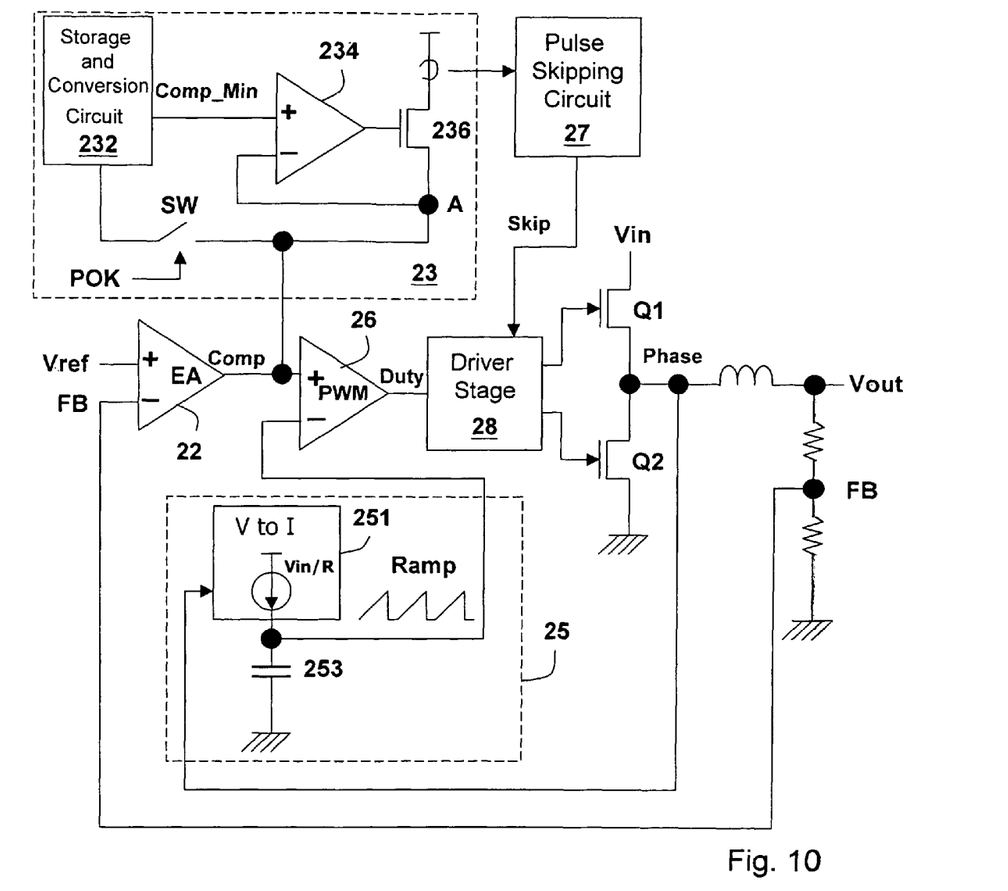
FIG. 10 shows another embodiment of the present invention.

The error amplification signal clamping circuit 23 and the Ramp setting circuit 25 can be embodied in various forms. For example, referring to the upper part of FIG. 10, the error amplification signal clamping circuit 23 includes a storage and conversion circuit 232, an operational amplifier 234 and a transistor 236 (which is shown in FIG. 10 as an NMOS, but it can certainly be replaced by a PMOS, with the positive and negative input terminals of the operational amplifier 234 interchanged). When the switching regulator becomes stable after initialization, typically, the circuit will generate a single-pulse POK signal. At this time point, the switching regulator is in the stable CCM, and the signal Comp is at a stable level in CCM. A switch SW is turned on by the POK signal, so that the signal Comp outputted from the error amplifier 22 is inputted to the storage and conversion circuit 232. The storage and conversion circuit 232 is for generating the minimum level Comp_Min which is slightly lower than the stable signal Comp in CCM. Considering the variation of the output of the error amplifier 22, the storage and conversion circuit 232 should preferably have a storage function, to store the level of the signal Comp in the stable CCM, or the minimum level Comp_Min. By the source follower circuit constituted by an operational amplifier 234 and a transistor 236, the voltage at node A can be clamped to the minimum level Comp_Min, that is, the positive input level of the PWM comparator 26 can be kept not less than the minimum level Comp_Min in the DCM and the pulse skipping mode.

Figure 11:
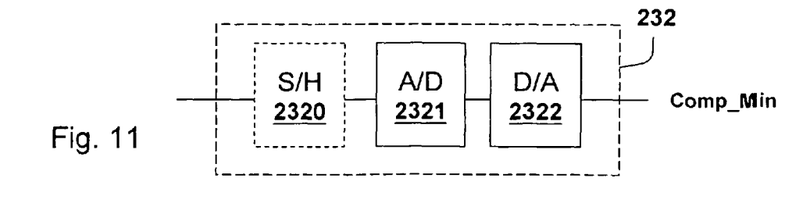
FIG. 11 shows an embodiment of the storage and conversion circuit 232.

The storage and conversion circuit 232 can be embodied in various forms. Referring to FIG. 11, as an example, the stable signal Comp can be converted to a digital signal by an analog-to-digital converter 2321, such that the value of the signal can be stored; the digital signal can be converted to the analog signal Comp_Min by a digital-to-analog converter 2322. In the analog-to-digital conversion and the digital-to-analog conversion, the analog signal Comp_Min can be set slightly lower than the signal Comp. In addition, if necessary, a sample-and-hold circuit 2320 can be provided in front of the analog-to-digital converter 2321, to ensure the accuracy of the signal Comp during analog-to-digital conversion.

Referring to the lower part of FIG. 10, the input voltage may fluctuate due to certain reason caused by the environment, such as line transient. The Ramp setting circuit 25 is provided for adaptively adjusting the slope of the signal Ramp in response to the change of the input voltage Vin, such that the level of the signal Comp at stable state is only related to the output voltage. Thus, as long as the reference voltage Vref does not change after the switching regulator boots up, the level of the signal Comp at stable state does not change (In some applications, the reference voltage Vref is a variable; in such a case if the signal Comp at stable state changes, the switch SW can be turned on again to store the signal Comp from the error amplifier 22 to the storage and conversion circuit 232 once more.) As mentioned earlier, one feature of the present invention is that the input signal Vin and the output signal Vout are not essential. Then how does the slope of signal Ramp vary in response to the input voltage Vin? In this embodiment, the Ramp setting circuit 25 is coupled to the node Phase between two power transistor switches. When the power transistor switch Q1 is turned on, information about the input voltage Vin can be obtained from the node Phase. The voltage obtained from the node Phase is converted to a current signal via a voltage-to-current circuit 251. This current charges a capacitor 253 to generate the signal Ramp.

Referring to FIGS. 1-4, each power transistor switch is coupled between a constant potential (the input voltage Vin, the output voltage Vout or ground) and the node Phase. Therefore, the node Phase can also be referred to as a "non-constant potential node".

Figure 12:
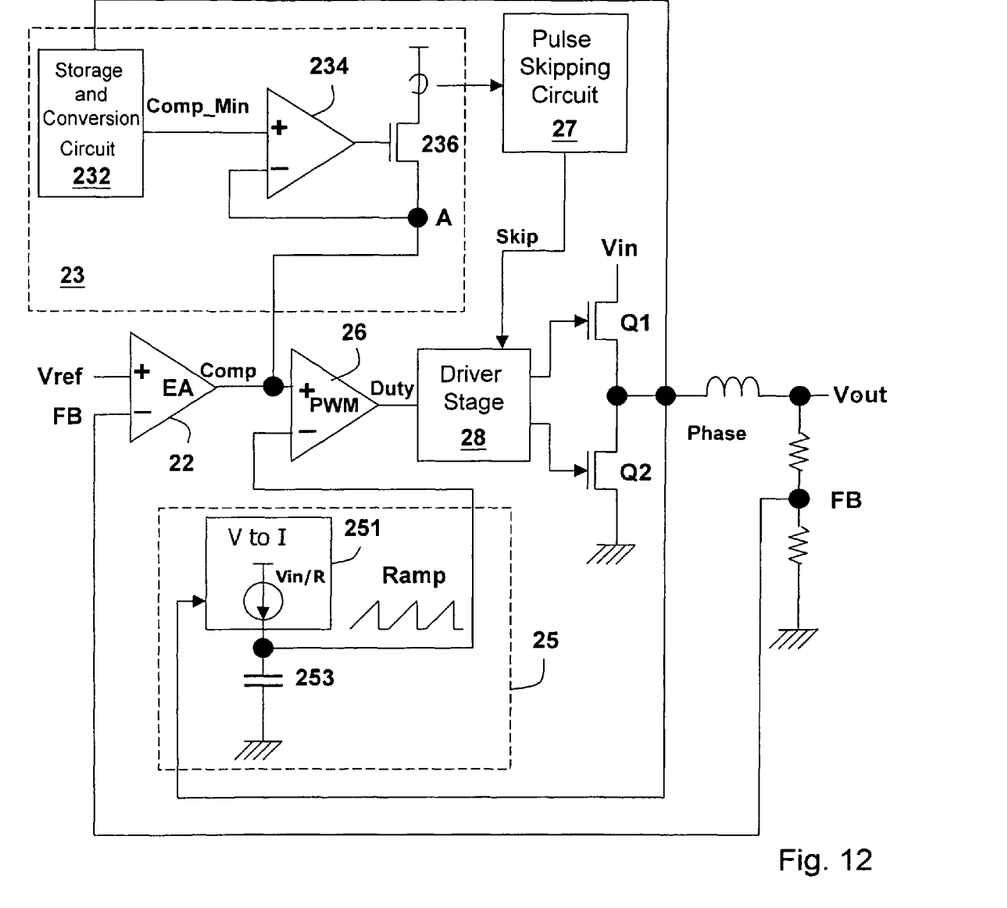
FIG. 12 shows another embodiment of the present invention.

FIG. 12 shows another embodiment of the present invention. In this embodiment, the storage and conversion circuit 233 obtains the pulse width of the signal Duty from the signal Phase, and it determines the minimum level Comp_Min according to the signal Duty. More specifically, the level of the signal Phase is equal to Vin as the signal Duty is ON, and equal to ground as the signal Duty is OFF. Therefore, the pulse width of the signal Duty can be obtained by the average voltage of the signal Phase divided by the input voltage Vin. The input voltage Vin can be obtained from the node Phase when the power transistor switch Q1 is turned on, and information about the input voltage Vin can be stored by a sample-and-hold circuit if necessary. Referring to FIG. 8, once the pulse width of the signal Duty is obtained, the corresponding level of the signal Comp in the stable CCM can be calculated with reference to the Ramp signal, and the minimum level Comp_Min is obtained. In this embodiment, the slope of the signal Ramp varies in response to the input voltage Vin.

Figure 13:
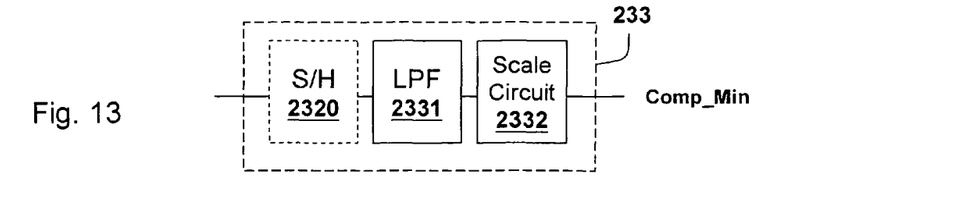
FIG. 13 shows an embodiment of the storage and conversion circuit 233.

The storage and conversion circuit 233 in FIG. 12 can be embodied in various forms. For example, referring to FIG. 13, the average voltage of the signal Phase can be obtained by a low pass filter circuit 2331, and its output is processed by a scale circuit 2332 to obtain the minimum level Comp_Min. A sample-and-hold circuit 2320 can be provided in front of the low-pass filter circuit 2331 if necessary.

The pulse skipping circuit 27 can be embodied in various forms. For example, in FIGS. 10 and 12, the pulse skipping circuit 27 can determine whether to generate a pulse skipping signal Skip according to the current through the transistor 236. When the current through the transistor 236 is extremely low or equal to zero, it means that the voltage at node A is less than the minimum level Comp_Min; in other words, the switching regulator should switch to the pulse skipping mode.

Figure 14:
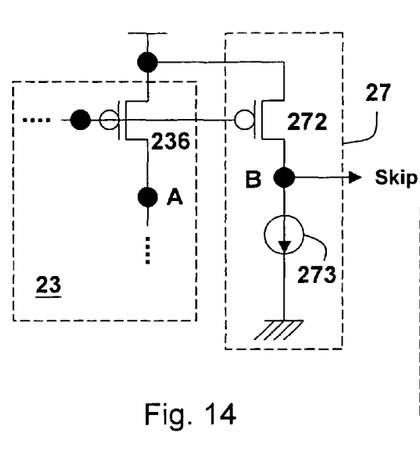
FIGS. 14-16 show three embodiments of the pulse skipping circuit 27.

FIG. 14 shows a first embodiment of the pulse skipping circuit 27. In this embodiment, the pulse skipping circuit 27 includes a transistor 272 and a current source 273. The transistor 272 and transistor 236 have a common gate and a common source such that the transistor 272 is able to sense the current through the transistor 236. When the current through the transistor 272 is higher than the current of the current source 273, the pulse skipping signal Skip is high; when the current through the transistor 272 is lower than the current of the current source 273, the pulse skipping signal Skip is low. In the above embodiment, the signal at node B directly serves as the pulse skipping Skip. However, the signal at node B can be processed before it serves as the pulse skipping signal Skip, as in the embodiments below.

Figure 15:
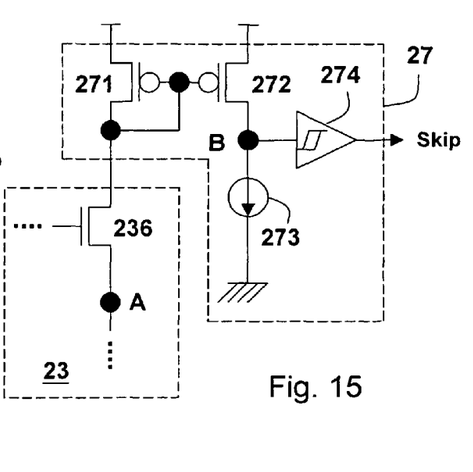

FIG. 15 shows a second embodiment of the pulse skipping circuit 27. In the embodiment, a transistor 271 and the transistor 272 constitute a current mirror, which is another way to sense the current through the transistor 236. Similarly, when the current through the transistor 272 is higher than the current of the current source 273, the level of node B is high; when the current through the transistor 272 is lower than the current of the current source 273, the level of node B is low. In this embodiment, the signal at node B first passes through a hysteresis gate circuit 274, and then serves as the pulse skipping signal Skip; in this way, it can reduce noises in the signal and adjust the signal to an appropriate level.

Figure 16:
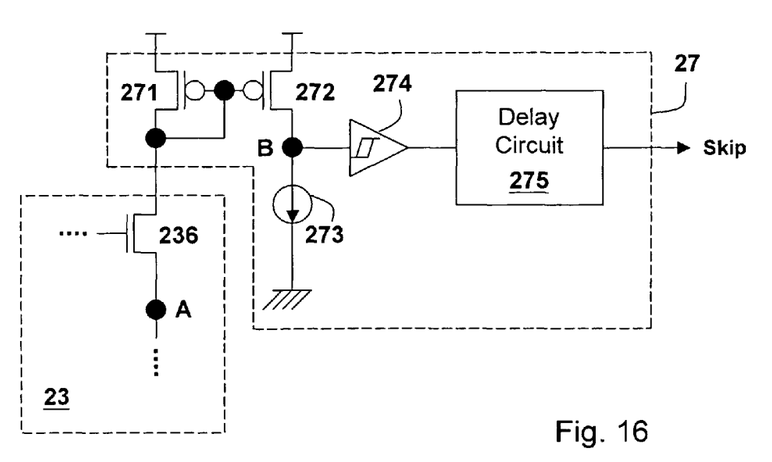

FIG. 16 shows a third embodiment of the pulse skipping circuit 27. In this embodiment, a delay circuit 275 is provided after the hysteresis gate circuit 274. The delay circuit 275 is to prevent the switching regulator from immediately switching to the pulse skipping mode when the signal Comp barely touches the minimum level Comp_Min, to prevent the signal Duty from being too short or unstable. With the delay circuit 275, the switching regulator enters the pulse skipping mode after the signal Comp reaches the minimum level Comp_Min for a period of time, or after at least one switching cycle of the power switches. The delay circuit 275 can be directly connected to the node B if no hysteresis gate circuit 274 is provided in the circuit.

Figure 17:
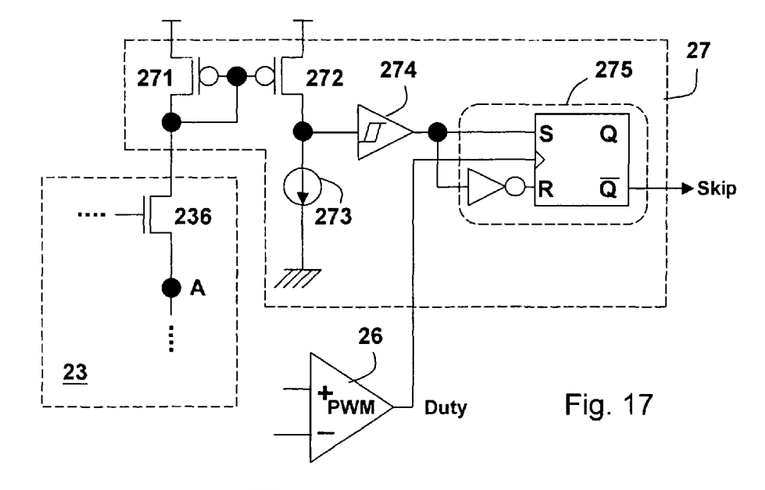
FIG. 17 shows an embodiment of the delay circuit 275.
Figure 18:
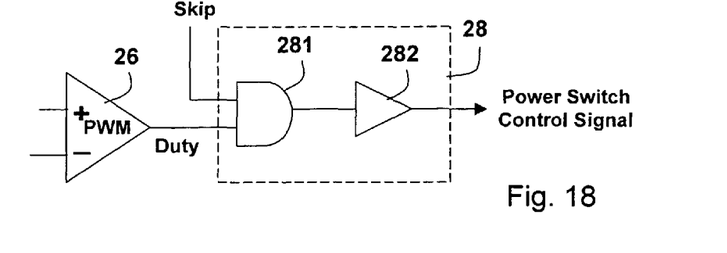
FIG. 18 shows an example as to how the driver stage circuit 28 enters the pulse skipping mode according to the pulse skipping signal (Skip).

An example of the delay circuit 275 is shown in FIG. 17, which is constituted by an SR flip-flop. The signal Duty is the clock input of the SR flip-flop, so that the pulse skipping signal Skip outputted from the SR flip-flop is delayed by one switching cycle of the power transistor switches. Depending on the design of the driver stage 28, the pulse skipping signal Skip Can be the positive or the negative output of the SR flip-flop. For example, if the driver stage 28 is as shown in FIG. 18, then the negative output signal of the SR flip-flop can be used as the pulse skipping signal Skip. In FIG. 18, the driver stage circuit 28 includes a logic gate circuit 281 and a driver gate 282. When the pulse skipping signal Skip is at low level, the signal Duty is masked, to accomplish the pulse skipping function.

Figure 19:
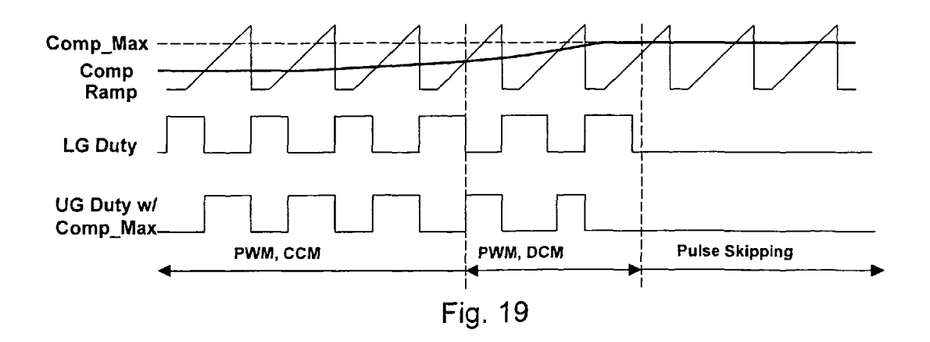
FIG. 19 shows the threshold level setting of the present invention in the up-gate off-time control scheme (or low-gate on-time control scheme).

In the aforementioned embodiments, it is to determine the on-time of the up gate switch by the comparison between the signal Comp and the ramp signal. But this invention is not limited to this. As shown in FIG. 19, under the same spirit of the present invention, the off-time of the up gate switch (or the on-time of the low gate switch) can also be determined by the comparison between the signal Comp and the ramp signal. In on the latter scheme to determine the off-time of the up gate switch (or the on-time of the low gate switch), the voltage Comprises as the load current decreases, and the pulse width of the signal to determine the off-time of the up gate switch (or to determine the on-time of the low gate switch) increases as well. Therefore, in such scheme, it is the maximum level of the signal Comp (Comp_Max) that needs to be set (in FIGS. 10 and 12, the output of the storage and conversion circuit 233 becomes Comp_Max). The rest of the circuit may be the same as any of those shown in FIGS. 9-17.

Compared with the prior art circuits, the present invention has the following advantages:

(1) The input voltage and output voltage signals are not required, so the circuit requires less number of pins, and it also avoids inaccuracies caused by errors in processing these signals.

(2) It is not required to set the minimum pulse width of the signal Duty, so it is not required to provide an additional PWM modulator for generating the minimum pulse width Min_Duty.

(3) Because the signal Comp has a minimum level, the mode transition characteristic from the pulse skipping mode back to the PWM mode is better.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positive and negative input terminals of the comparators, error amplifiers, and operational amplifiers are interchangeable, and the NMOS or PMOS transistor can be replaced by each other, with corresponding amendment of the circuit in processing these signals. As another example, a device which does not substantially influence the primary function of a signal can be inserted between any two devices in the shown embodiments, such as a switch or the like. As yet another example, this invention is also applicable to the asynchronous regulator architecture wherein one of the power transistor switches is replaced by a diode. In view of the foregoing, the spirit of the present invention should cover all such and other modifications and variations, which should be interpreted to fall within the scope of the following claims and their equivalents.

What is claimed is:

1. A voltage mode switching regulator switchable between a pulse width modulation (PWM) mode and a pulse skipping mode, comprising:

a power switch circuit including at least one power transistor switch, which converts an input voltage to an output voltage by operating the power transistor switch;

an error amplifier generating an error amplification signal by comparing a feedback signal relating to the output voltage with a reference signal;

a PWM comparator generating a duty signal according to the error amplification signal and a ramp signal, to thereby control the power transistor switch of the power switch circuit;

an error amplification signal clamping circuit, which sets a threshold level of the error amplification signal and a threshold level of the pulse skipping mode, and clamps the error amplification signal so that the error amplification signal is not lower than the threshold level in a power transistor switch on-time control mode, or that the error amplification signal is not higher than the threshold level in a power transistor switch off-time control mode; and a pulse skipping circuit generating a pulse skipping signal when the error amplification signal is less than or equal to the threshold level of the pulse skipping mode, such that the switching regulator enters the pulse skipping mode.

2. The switching regulator of claim 1, wherein the error amplification signal clamping circuit is not directly connected to the input voltage or the output voltage.

3. The switching regulator of claim 1, wherein the PWM mode includes a continuous conduction mode (CCM) and a discontinuous conduction mode (DCM), and the error amplification signal clamping circuit includes a storage and conversion circuit, for generating the threshold level of the error amplification signal according to the error amplification signal in CCM.

4. The switching regulator of claim 3, wherein the storage and conversion circuit includes:
an analog-to-digital converter, which converts the error amplification signal in CCM to a digital signal; and
a digital-to-analog converter, which converts the digital signal to the threshold level of the error amplification signal.

5. The switching regulator of claim 3, wherein the error amplification signal clamping circuit further includes:
an operational amplifier having one input terminal coupled to an output of the storage and conversion circuit; and
a transistor controlled by an output of the operational amplifier, the transistor having a terminal coupled to another input terminal of the operational amplifier, wherein the terminal of the transistor sets the threshold level of the error amplification signal.

6. The switching regulator of claim 1, wherein the error amplification signal clamping circuit includes a storage and conversion circuit for generating the threshold level of the error amplification signal according to a voltage at a non-constant potential node coupled to the power transistor switch.

7. The switching regulator of claim 6, wherein the storage and conversion circuit includes:
a low-pass filter obtaining an average voltage of the non-constant potential node; and
a scale circuit generating the threshold level of the error amplification signal according to an output of the low-pass filter.

8. The switching regulator of claim 6, wherein the error amplification signal clamping circuit further includes:
an operational amplifier having an input terminal coupled to the output of the storage and conversion circuit; and
a transistor controlled by the output of the operational amplifier, the transistor having a terminal coupled to another input terminal of the operational amplifier, wherein the terminal of the transistor sets the threshold level of the error amplification signal.

9. The switching regulator of claim 1, further including a ramp setting circuit for setting the slope of the ramp signal so that the slope is related to the input voltage.

10. The switching regulator of claim 9, wherein the ramp setting circuit is not directly coupled to the input voltage or the output voltage.

11. The switching regulator of claim 9, wherein the ramp setting circuit includes:
a voltage-to-current converter converting a voltage at a node coupled to the power transistor switch to a current signal proportional to the input voltage; and
a capacitor charged by the current signal to generate the ramp signal.

12. The switching regulator of claim 1, wherein the pulse skipping circuit generates the pulse skipping signal according to a current through the error amplification signal clamping circuit.

13. The switching regulator of claim 1, wherein the pulse skipping circuit includes:
a current sensing circuit sensing a current through the error amplification signal clamping circuit; and
a current source circuit coupled to the current sensing circuit at a node.

14. The switching regulator of claim 13, wherein the pulse skipping circuit further includes a hysteresis gate circuit coupled to the coupling node between the current sensing circuit and the current source circuit.

15. The switching regulator of claim 13, wherein the pulse skipping circuit further includes a delay circuit coupled to the coupling node between the current sensing circuit and the current source circuit.

16. A voltage mode switching regulator control circuit comprising:
an error amplifier generating an error amplification signal by comparing a feedback signal with a reference signal;
a pulse width modulation (PWM) comparator generating a duty signal according to an error amplification signal and a ramp signal;
an error amplification signal clamping circuit, which sets a threshold level of the error amplification signal and a threshold level of a pulse skipping mode, and clamps the error amplification signal so that the error amplification signal is not lower than the threshold level in an on-time control mode, or that the error amplification signal is not higher than the threshold level in an off-time control mode; and
a pulse skipping circuit, which generates a pulse skipping signal when the error amplification signal is close or equal to the threshold level of the pulse skipping mode.

17. The control circuit of claim 16, wherein the switching regulator converts an input voltage to an output voltage by operating at least one power transistor switch, and wherein the control circuit is not directly connected to the input voltage or the output voltage.

18. The control circuit of claim 16, wherein the switching regulator is switchable between a continuous conduction mode (CCM) and a discontinuous conduction mode (DCM), and wherein the error amplification signal clamping circuit includes a storage and conversion circuit for generating the threshold level of the error amplification signal according to the error amplification signal in CCM.

19. The control circuit of claim 18, wherein the storage and conversion circuit includes:
an analog-to-digital converter converting the error amplification signal in CCM to a digital signal; and
a digital-to-analog converter converting the digital signal to the threshold level of the error amplification signal.

20. The control circuit of claim 18, wherein the error amplification signal clamping circuit further includes:
an operational amplifier having one input terminal coupled to an output of the storage and conversion circuit; and
a transistor controlled by an output of the operational amplifier, the transistor having a terminal coupled to another input terminal of the operational amplifier, wherein the terminal of the transistor sets the threshold level of the error amplification signal.

21. The control circuit of claim 16, wherein the switching regulator converts an input voltage to an output voltage by operating at least one power transistor switch, and wherein the error amplification signal clamping circuit includes a storage and conversion circuit for setting the threshold level of the error amplification signal according to a voltage at a non-constant potential node which is coupled to the power transistor switch.

22. The control circuit of claim 21, wherein the storage and conversion circuit includes:
   a low-pass filter obtaining an average voltage of the non-constant potential node; and
   a scale circuit generating the threshold level of the error amplification signal according to an output of the low-pass filter.

23. The control circuit of claim 21, wherein the error amplification signal clamping circuit further includes:
   an operational amplifier having an input terminal coupled to an output of the storage and conversion circuit; and
   a transistor controlled by the output of the operational amplifier, the transistor having a terminal coupled to another input terminal of the operational amplifier, wherein the terminal of the transistor sets the error amplification signal threshold level.

24. The control circuit of claim 16, wherein the switching regulator converts an input voltage to an output voltage by operating at least one power transistor switch, and wherein the control circuit further includes a ramp setting circuit for setting a slope of the ramp signal so that the slope is related to the input voltage.

25. The control circuit of claim 24, wherein the ramp signal setting circuit includes:
   a voltage-to-current converter converting a voltage at a non-constant potential node coupled to the power transistor switch to a current signal proportional to the input voltage; and
   a capacitor charged by the current signal to generate the ramp signal.

26. The control circuit of claim 16, wherein the pulse skipping circuit generates a pulse skipping signal according to a current through the error amplification signal clamping circuit.

27. The control circuit of claim 16, wherein the pulse skipping circuit includes:
   a current sensing circuit sensing a current through the error amplification signal clamping circuit; and
   a current source circuit coupled to the current sensing circuit at a node.

28. The control circuit of claim 27, wherein the pulse skipping circuit further includes a hysteresis gate circuit coupled to the coupling node between the current sensing circuit and the current source circuit.

29. The control circuit of claim 27, wherein the pulse skipping circuit further includes a delay circuit coupled to the coupling node between the current sensing circuit and the current source circuit.

30. A method for controlling a voltage mode switching regulator, wherein the switching regulator is switchable between a pulse width modulation (PWM) mode and a pulse skipping mode, the method comprising the steps of:
   comparing a feedback signal relating to an output voltage with a reference signal, to generate an error amplification signal;
   generating a duty signal according to the error amplification signal and a ramp signal, to control the switching regulator;
   setting a threshold level of the error amplification signal and a threshold level of the pulse skipping mode, and clamping the error amplification signal so that the error amplification signal is not lower than the threshold level in an on-time control mode, or that the error amplification signal is not higher than the threshold level in an off-time control mode; and
   when the error amplification signal is close or equal to the threshold level of the pulse skipping mode, generating a pulse skip signal such that the switching regulator enters the pulse skipping mode.

31. The method of claim 30, wherein the PWM mode includes a continuous conduction mode (CCM) and a discontinuous conduction mode (DCM), and the step of setting the threshold level of the error amplification signal includes:
   converting the error amplification signal in CCM to a digital signal; and
   converting the digital signal to the threshold level of the error amplification signal.

32. The method of claim 31, wherein the step of setting the threshold level of error amplification signal further includes:
   sampling and holding the error amplification signal in CCM.

33. The method of claim 30, wherein the switching regulator includes at least one power transistor switch having a terminal coupled to a non-constant potential node, and an input voltage is converted to an output voltage by operating the power transistor switch, and wherein the step of setting the threshold level of the error amplification signal includes:
   obtaining an average voltage of the non-constant potential node; and
   generating the threshold level of the error amplification signal according to the average voltage.

34. The method of claim 33, wherein the step of setting the threshold level of the error amplification signal further includes: sampling and holding the voltage at the non-constant potential node.

35. The method of claim 30, further including the step of: setting the slope of the ramp signal so that the slope is related to the input voltage.

36. The method of claim 35, wherein the switching regulator includes at least one power transistor switch, which is coupled between an input voltage and a node, and an input voltage is converted to an output voltage by operating the power transistor switch, and wherein the step of setting the slope of the ramp signal includes:
   converting a voltage of the node coupled to the power transistor switch to a current signal proportional to the input voltage; and
   charging a capacitor by the current signal, to generate the ramp signal.

* * * * *